(No Model.)
O. LOOK.
VEHICLE WHEEL.
No. 281,279. Patented July 17, 1883.
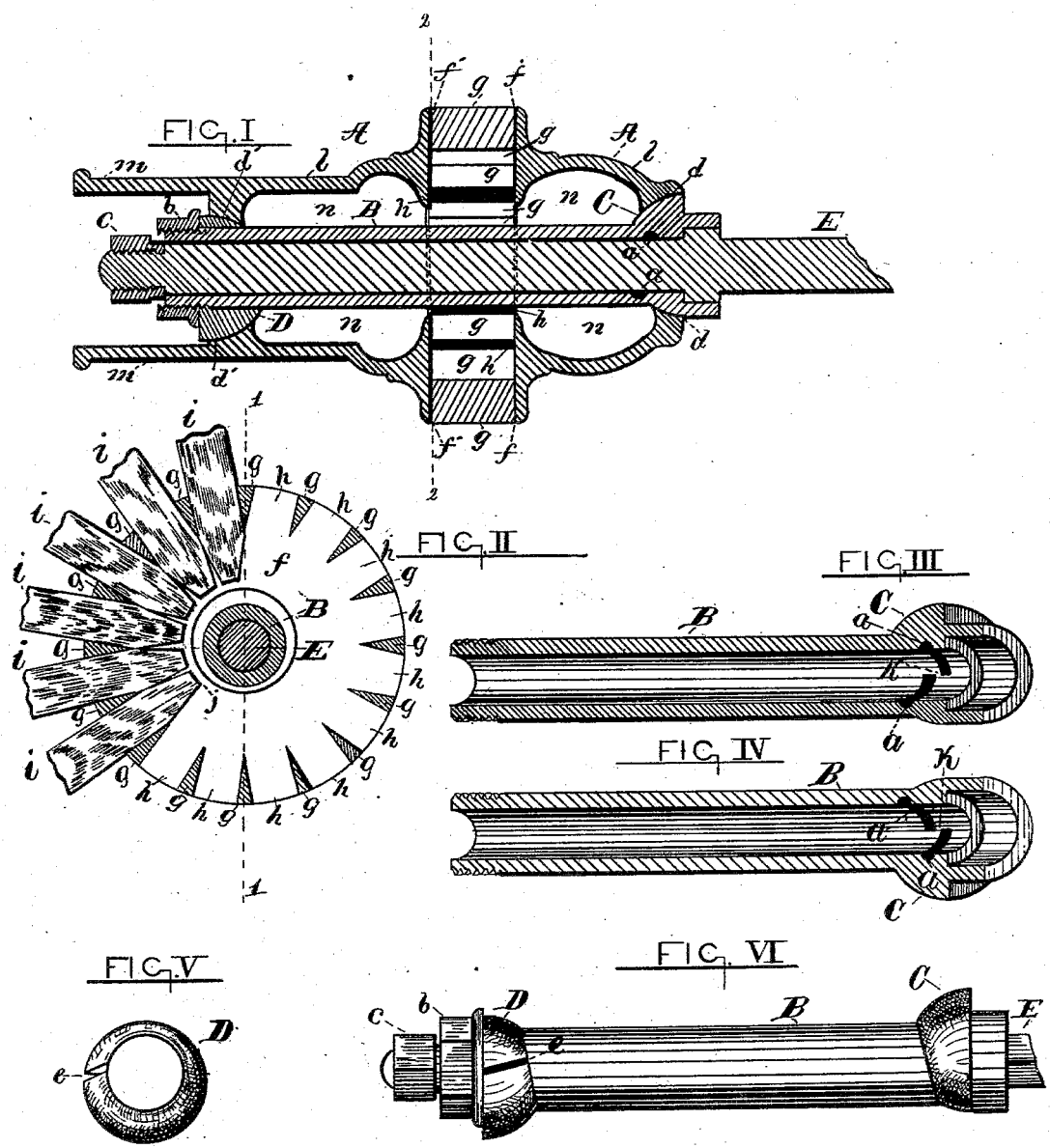
Witnesses.
Timothy P. Callahan
William H. Foskit.
Inventor:
Obed Look
By Geo. D. Phillips

UNITED STATES PATENT OFFICE.

OBED LOOK, OF BRIDGEPORT, CONNECTICUT.

VEHICLE-WHEEL.

SPECIFICATION forming part of Letters Patent No. 281,279, dated July 17, 1883.

Application filed May 9, 1883. (No model.)

*To all whom it may concern:*

Be it known that I, OBED LOOK, a citizen of the United States, and a resident of Bridgeport, in the county of Fairfield and State of Connecticut, have invented certain new and useful Improvements in Wheels for Vehicles, of which the following is a specification.

My invention relates to a metallic hub and box, and is an improvement on the device for which Letters Patent were granted to me August 12, 1873, and numbered 141,652. Said device consisted of a hub having a circular opening through the center, with eccentric recesses to the same on opposite ends, and the box provided with an eccentric re-enforce and an adjustable eccentric thimble, the object being to true the wheel and replace a worn and defective axle-box without disturbing the spokes or otherwise injuring the wheel.
My present invention consists in splitting the adjustable eccentric thimble to enable it to close and firmly grip the axle-box when the said thimble is forced into the eccentric recess of the hub.
It further consists in forming semicircular oil-chambers in the upper and lower half of the inner circumference of the axle-box to intercept the flow of oil and cause the same to be brought in contact with the axle.
It further consists of a skeleton hub of a light metallic casting, the band and body of same of one piece, the interior of the hub cored out of the same contour or form as the exterior, thus making a light, strong, and elastic hub, the front and back sections of the same joined and held together by the mortise-ties only, thereby enabling the two sections to be slightly sprung together at the center of the hub and exert a pressure on the spokes, as will be more fully set forth in the following specification.

Referring to the drawings, Figure I represents a sectional view of the hub, axle-box, and axle through the dotted line 1 of Fig. II. Fig. II is a sectional view of the hub, axle-box, and axle through the dotted line 2 of Fig. I. Fig. III represents a sectional view, in perspective, of the axle-box. Fig. IV is a sectional view, in perspective, of the opposite half of the axle-box. Fig. V represents a view of the eccentric thimble. Fig. VI represents a view of the axle-box, thimble, axle, and nuts.

Its construction and operation are as follows:

A is the hub; B, the axle-box; C, its re-enforce; D, adjustable eccentric thimble; E, axle;
$a$, oil-chambers; $b$, nut to secure axle-box; $c$, axle-nut; $d$, eccentric recesses in the hub; $e$, opening in thimble; $f$, flange of hub; $g$, mortise-ties; $h$, mortise.

The eccentric recesses $d$ $d'$ of the hub (see Fig. I) are formed around the opening to admit the eccentric thimble D and eccentric re-enforce C of the axle-box, said recesses being eccentric to the center of the hub. The threaded nut $b$, fitting a corresponding thread on the axle-box, serves to hold the thimble D and re-enforce C of the box firmly against the eccentric recesses of the hub. The thimble D and re-enforce C are placed in such relation to their respective seats in the hub that the box when the wheel is first constructed will be situated as near the center of the hub as possible; but after the wheel has been in use for some time it may require truing up, which is done by simply loosening the nut $b$ and turning the thimble D and axle-box B, with re-enforce C, sufficient to properly true the wheel. The nut $b$ is then screwed up, bringing the thimble and re-enforce firmly to their respective seats in the hub. The pressure of the thimble D against the eccentric recess $d'$ of the hub will close the opening $e$ of the thimble sufficient to firmly grip the axle-box. Thus the hub and axle-box are connected more firmly together than would be the case if the thimble were solid.

In Fig. I the highest point of the re-enforce C and of the thimble D are exactly opposite each other, thus representing the full extent of throw that could be obtained.

As represented by Fig. I, the entire hub, including band $m$, is cast in one piece, preferably of malleable iron, the interior cored out, forming the chambers $n$ $n$, the contour of the interior conforming nearly to the shape of the exterior, thus making a skeleton hub light and strong, and, being made of malleable iron, it is capable, when bruised or bent by accident, of being readily restored to its former shape. The two sections $l$ $l$ of the hub are joined together by the mortise $g$ only, thus permitting the lower part of the flanges $f$ $f'$, below the ties $g$, to spring in, when the nut $b$ is screwed up, and press firmly against the spokes $i$ in the mortise $h$. (See Fig. II.) The spokes being driven therein are held by the flanges $f$ $f'$ and the support they receive between the ties $g$. The ends $j$ of the spokes do not bottom, the said ends being unsupported in the hub, thus enabling the spokes to accommodate themselves to the expansion and contraction of the wheel and prevent their springing out of shape, which has proved a serious objection to metallic hubs.

The oil-reservoirs $a$ (see Figs. III and IV) consist of a series of two or more semicircular grooves formed on the inner circumference of the axle-box. The grooves of the upper and lower half, instead of meeting each other, are set by, leaving the solid partition or bridge K between them. This operates to prevent the oil remaining constantly in the groove $a$, which it would do if the same were continuous; or, in other words, an unbroken groove extending entirely around the inner circumference of the axle-box, for while the wheel was revolving the tendency of the oil would be to remain in the groove, and especially would this be the case in a wheel revolving very rapidly, and when the wheel was stationary the oil would follow around the groove and find its level at the bottom or lowest point, and consequently but little would reach the axle; but by means of the broken groove, as shown, the flow of oil is broken and continually brought in contact with the axle.

Having thus described my invention, what I claim as new, and desire to secure by Letters Patent, is—

1. As an improvement in wheels for vehicles, the combination of the skeleton metallic hub A, having eccentric recesses $d$ and $d'$, and axle-box B, having eccentric re-enforce C cast thereon, and the split eccentric thimble D, adapted to close when forced into the eccentric recess of the hub by the action of the nut $b$ and firmly grip the axle-box, as described and set forth.

2. The skeleton hub A, as shown, having eccentric recesses $d$ and $d'$, the two sections $l\ l$ of said hub joined and held together by the mortise-ties $g$, the said hub thus adapted to be compressed by means of the nut $b$ of the axle-box, and by such action grip and hold the spokes $i$ between the flanges $f f'$, said spokes having their ends $j$, unsupported, and adapted thereby to give slightly in the mortise, and thus provide the proper elasticity to the wheel, substantially as set forth.

3. The axle-box B, having eccentric re-enforce C, and provided with the semicircular oil-chambers $a$, and adapted by the arrangement of the said chambers, as shown, to intercept the flow of oil and cause the same to be brought directly in contact with the axle, substantially as shown and described, and for the purpose set forth.

In witness whereof I have hereunto signed my name in the presence of two subscribing witnesses.

Signed at Bridgeport, in the county of Fairfield and State of Connecticut, this 30th day of April, A. D. 1883.

OBED LOOK.

Witnesses:
RUDOLPH KORT,
WILLIAM B. COOK.